Feb. 5, 1957 L. F. SCHWAB 2,780,480
DRAWBAR FOR TRAILERS

Filed May 11, 1955 2 Sheets-Sheet 1

Leonard F. Schwab
INVENTOR.

Feb. 5, 1957 L. F. SCHWAB 2,780,480
DRAWBAR FOR TRAILERS
Filed May 11, 1955 2 Sheets-Sheet 2
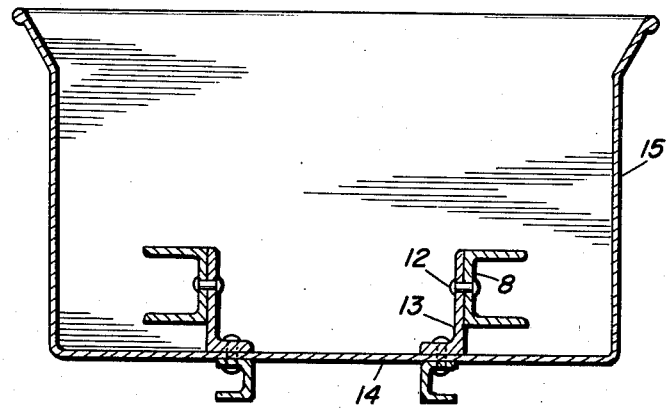
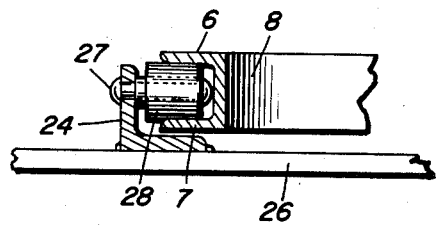
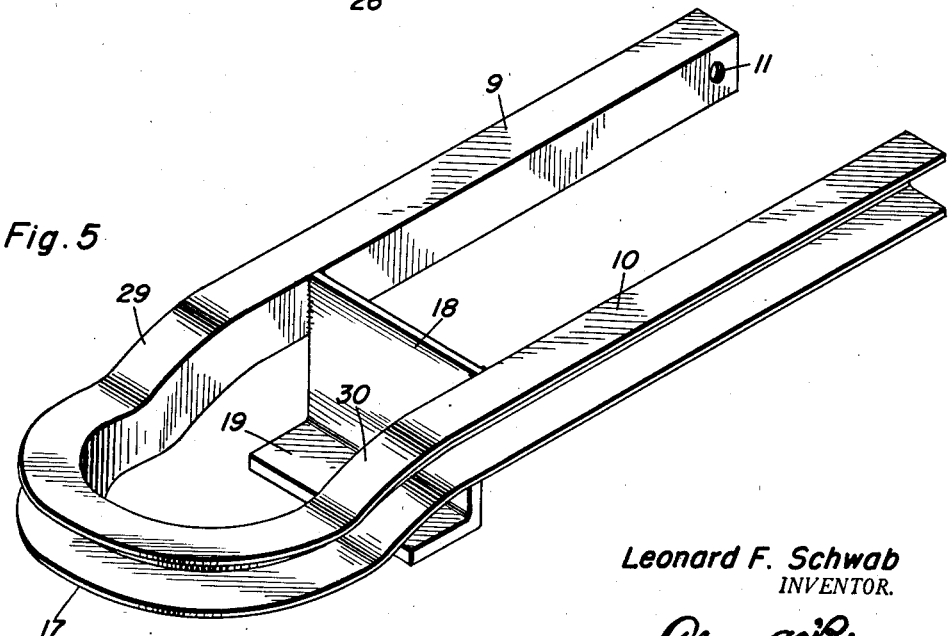
Leonard F. Schwab
INVENTOR.

United States Patent Office 2,780,480
Patented Feb. 5, 1957

2,780,480

DRAWBAR FOR TRAILERS

Leonard F. Schwab, Hamilton, Ohio

Application May 11, 1955, Serial No. 507,609

2 Claims. (Cl. 280—499)

The present invention relates to new and useful improvements in drawbars for use with trailers.

An important object of the invention is to provide a channel drawbar of U-shape having its end portions pivoted to the body of a pick-up truck or other towing vehicle for vertical swinging movement of the drawbar and facing the channel of the drawbar outwardly to form a track for one or more rollers on a trailer tongue to support the weight of the front end of the trailer on the drawbar.

Another object is to provide a swivel support on the drawbar for the front end of the trailer tongue, as well as at an intermediate point of the trailer tongue to reduce strain on the front swivel.

A further object is to construct the channel of the drawbar with inclined portions to form stops for limiting the range of turning movement of the towing vehicle relative to the trailer to prevent damage by one striking the other.

A still further object is to provide a device of this character of simple and practical construction, which is efficient and reliable in operation, strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 3 is an enlarged transverse sectional view taken on a line 3—3 of Figure 2;

Figure 4 is an enlarged fragmentary sectional view taken on a line 4—4 of Figure 1; and Figure 5 is an enlarged perspective view of the drawbar.

Figure 1:
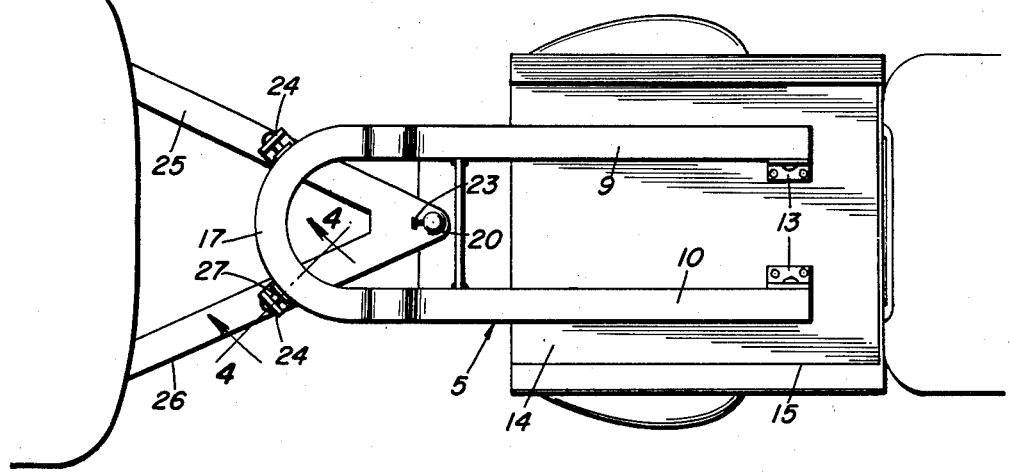
Figure 1 is a top plan view.
Figure 2:
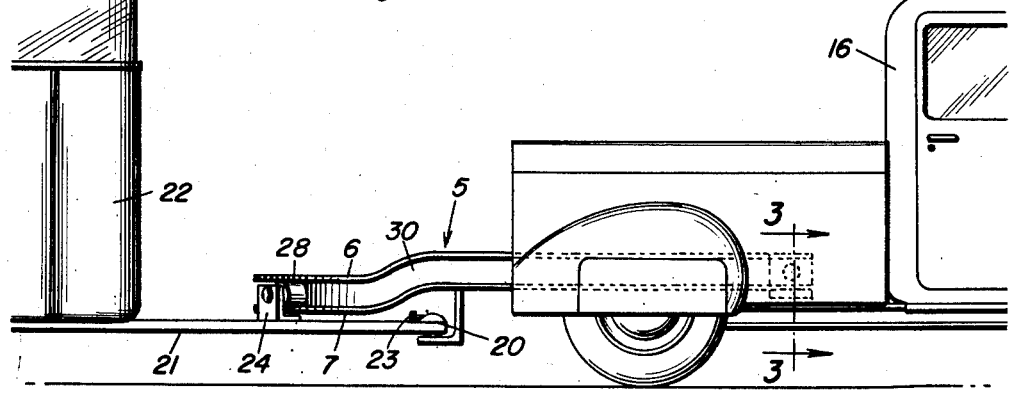
Figure 2 is a side elevational view.

Referring now to the drawings in detail, wherein for the purpose of illustration I have disclosed a preferred embodiment of my invention, the numeral 5 designates a U-shaped drawbar of channel iron with the channel facing outwardly to form upper and lower flanges 6 and 7.

The web portion 8 of the channel adjacent the ends of the parallel arm portions 9 and 10 of the drawbar are provided with openings 11 for pivotally connecting the same to rivets or the like 12 on angle brackets 13 which are secured to the bed 14 inside the body 15 of a pick-up truck 16 or other towing vehicle, and with the arcuate portion 17 of the drawbar projecting rearwardly beyond the truck body.

An angle iron support 18 is welded to the arm portions 9 and 10 of the drawbar to provide a shelf 19 supported below the drawbar and on top of which a ball (not shown) is welded and over which is placed a socket 20 at the front end of a V-shaped tongue 21 of a trailer 22. A locking device 23 of a conventional type secures the socket swivelling engaged with the ball.

An angle bracket 24 is welded on top of each diverging arm portion 25 and 26 of the tongue and a stub shaft 27 is supported in a horizontal position on each bracket 24 and on which a roller 28 is journalled for traveling in the arcuate portion 17 of the channel. The diameter of the roller is substantially equal to the distance between the upper and lower flanges of the channel to travel on both flanges and eliminate play.

The drawbar in the region of the junction of the arcuate and arm portions thereof is formed with inclined portions 29 and 30 which form stops to limit travel of the rollers from passing out of the arcuate portion 17 into the arm portions 9 and 10 of the drawbar and to prevent damage to either the towing vehicle or the trailer by one striking the other when turning.

The trailer tongue 21 is supported at both its front end by the ball and socket and also at both diverging arms 25 and 26 on the drawbar to relieve the ball and socket from the entire weight of the front end of the trailer and the two rollers on the diverging arms of the tongue reduce danger of the trailer tipping over.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

1. A trailer hitch comprising in combination, a drawbar adapted for attaching to a towing vehicle and having an arcuate channelled rear end portion, a trailer tongue, means swivelly connecting the tongue to the drawbar, and a pair of rollers journalled on the tongue and supported by and traveling in the channelled portion of the drawbar, said channelled portion including inclined portions checking travel of the rollers upon a turning movement of the towing vehicle in either direction.

2. A trailer hitch comprising in combination, a U-shaped drawbar, means attaching the end portions thereof to a towing vehicle, said drawbar having an arcuate outwardly facing channel at the rear of the towing vehicle, a support carried by the drawbar, a trailer tongue, means swivelly connecting the tongue to the drawbar, and a roller journalled on the tongue for traveling in the channel, said arcuate channel of the drawbar having inclined portions checking travel of the roller in opposite directions to limit swinging movement of the tongue relative to the drawbar.

References Cited in the file of this patent

UNITED STATES PATENTS

| | | |
|---|---|---|
| 1,304,276 | De Haeseleer | May 20, 1919 |
| 2,062,282 | Acton | Dec. 1, 1936 |
| 2,679,404 | Thompson | May 25, 1954 |

FOREIGN PATENTS

| | | |
|---|---|---|
| 354,052 | Germany | Dec. 21, 1919 |